United States Patent
Wolrich et al.

(10) Patent No.: US 7,082,104 B2
(45) Date of Patent: Jul. 25, 2006

(54) NETWORK DEVICE SWITCH

(75) Inventors: Gilbert Wolrich, Framingham, MA (US); Matthew J. Adiletta, Worcester, MA (US); Aaron Gorius, Upton, MA (US); Donald F. Hooper, Shrewsbury, MA (US); Douglass Carrigan, Westford, MA (US); Chandra Vora, Northborough, MA (US)

(73) Assignee: Intel Corporation, Santa Clara, CA (US)

( * ) Notice: Subject to any disclaimer, the term of this patent is extended or adjusted under 35 U.S.C. 154(b) by 635 days.

(21) Appl. No.: 09/861,103

(22) Filed: May 18, 2001

(65) Prior Publication Data

US 2002/0172210 A1 Nov. 21, 2002

(51) Int. Cl.
*H04L 12/56* (2006.01)
(52) U.S. Cl. .................. 370/236; 370/389; 370/503
(58) Field of Classification Search .............. 370/412, 370/428, 467, 465, 389–390, 392, 395.71, 370/415–416, 357–360, 363, 375, 380, 386, 370/426, 463, 244–245, 249–250, 253, 230; 379/165; 702/122, 124–125; 709/213
See application file for complete search history.

(56) References Cited

U.S. PATENT DOCUMENTS

| | | | |
|---|---|---|---|
| 4,703,435 A | 10/1987 | Darringer et al. | |
| 4,970,664 A | 11/1990 | Kaiser et al. | |
| 5,128,871 A | 7/1992 | Schmitz | |
| 5,212,650 A | 5/1993 | Hooper et al. | |
| 5,220,512 A | 6/1993 | Watkins et al. | |
| 5,258,919 A | 11/1993 | Yamanouchi et al. | |
| 5,267,175 A | 11/1993 | Hooper | |
| 5,278,769 A | 1/1994 | Bair et al. | |
| 5,287,289 A | 2/1994 | Kageyama et al. | |
| 5,297,053 A | 3/1994 | Pease et al. | |
| 5,301,318 A | 4/1994 | Mittal | |
| 5,384,710 A | 1/1995 | Lam et al. | |
| 5,475,605 A | 12/1995 | Lin | |
| 5,493,507 A | 2/1996 | Shinde et al. | |
| 5,506,788 A | 4/1996 | Cheng et al. | |
| 5,513,119 A | 4/1996 | Moore et al. | |
| 5,544,067 A | 8/1996 | Rostoker et al. | |
| 5,553,002 A | 9/1996 | Dangelo et al. | |
| 5,568,397 A | 10/1996 | Yamashita et al. | |
| 5,572,522 A * | 11/1996 | Calamvokis et al. | ....... 370/390 |
| 5,598,347 A | 1/1997 | Iwasaki | |

(Continued)

FOREIGN PATENT DOCUMENTS

EP 0 404 482 12/1990

(Continued)

OTHER PUBLICATIONS

Computer Design, "After Hard Knocks, Cycle-Based Simulators Stand Their Ground". http://www.computer-design.com/Editorial/1996/10/ASIC/after.html, accessed on Aug. 23, 2001, pp. 1-5.

Foley et al., "An Object Based Graphical User Interface for Power Systems", IEEE Transactions on Power Systems, vol. 8, No. 1, Feb. 1993, pp. 97-104.

(Continued)

*Primary Examiner*—Chi Pham
*Assistant Examiner*—Anh-Vu Ly
(74) *Attorney, Agent, or Firm*—Fish & Richardson P.C.

(57) ABSTRACT

A switch for transmitting data from a first device to a second device includes a port in communication with the second device, queues which store slices of data received from the first device, and circuitry for selectively outputting a slice of the data from at least one of the queues to the port for transmission to the second device.

15 Claims, 5 Drawing Sheets

U.S. PATENT DOCUMENTS

| | | | |
|---|---|---|---|
| 5,603,015 A | 2/1997 | Kurosawa et al. | |
| 5,604,894 A | 2/1997 | Pickens et al. | |
| 5,629,857 A | 5/1997 | Brennan | |
| 5,663,662 A | 9/1997 | Kurosawa | |
| 5,666,289 A | 9/1997 | Watkins | |
| 5,673,198 A | 9/1997 | Lawman et al. | |
| 5,685,006 A | 11/1997 | Shiraishi | |
| 5,694,579 A | 12/1997 | Razdan et al. | |
| 5,706,476 A | 1/1998 | Giramma | |
| 5,717,928 A | 2/1998 | Campmas et al. | |
| 5,724,250 A | 3/1998 | Kerzman et al. | |
| 5,757,655 A | 5/1998 | Shih et al. | |
| 5,809,283 A | 9/1998 | Vaidyanathan et al. | |
| 5,828,581 A | 10/1998 | Matumura | |
| 5,831,869 A | 11/1998 | Ellis et al. | |
| 5,841,663 A | 11/1998 | Sharma et al. | |
| 5,852,564 A | 12/1998 | King et al. | |
| 5,859,837 A * | 1/1999 | Crayford | 370/230 |
| 5,889,677 A | 3/1999 | Yasuda et al. | |
| 5,892,678 A | 4/1999 | Tokunoh et al. | |
| 5,892,682 A | 4/1999 | Hasley et al. | |
| 5,903,469 A | 5/1999 | Ho | |
| 5,933,356 A | 8/1999 | Rostoker et al. | |
| 5,937,190 A | 8/1999 | Gregory et al. | |
| 5,963,724 A | 10/1999 | Mantooth et al. | |
| 5,974,242 A | 10/1999 | Damarla et al. | |
| 5,991,295 A * | 11/1999 | Tout et al. | 370/395.7 |
| 6,044,211 A | 3/2000 | Jain | |
| 6,053,947 A | 4/2000 | Parson | |
| 6,066,179 A | 5/2000 | Allan | |
| 6,077,304 A | 6/2000 | Kasuya | |
| 6,101,190 A * | 8/2000 | Song | 370/411 |
| 6,106,568 A | 8/2000 | Beausang et al. | |
| 6,117,183 A | 9/2000 | Teranishi et al. | |
| 6,120,549 A | 9/2000 | Goslin et al. | |
| 6,132,109 A | 10/2000 | Gregory et al. | |
| 6,135,647 A | 10/2000 | Balakrishnan et al. | |
| 6,152,612 A | 11/2000 | Liao et al. | |
| 6,161,211 A | 12/2000 | Southgate | |
| 6,178,541 B1 | 1/2001 | Joly et al. | |
| 6,205,573 B1 | 3/2001 | Hasegawa | |
| 6,208,954 B1 | 3/2001 | Houtchens | |
| 6,216,256 B1 | 4/2001 | Inoue et al. | |
| 6,219,822 B1 | 4/2001 | Griestede et al. | |
| 6,226,780 B1 | 5/2001 | Bahra et al. | |
| 6,233,540 B1 | 5/2001 | Schaumont et al. | |
| 6,233,723 B1 | 5/2001 | Pribetich | |
| 6,234,658 B1 | 5/2001 | Houldsworth | |
| 6,236,956 B1 | 5/2001 | Mantooth et al. | |
| 6,259,699 B1 * | 7/2001 | Opalka et al. | 370/398 |
| 6,260,179 B1 | 7/2001 | Ohsawa et al. | |
| 6,272,671 B1 | 8/2001 | Fakhry | |
| 6,275,973 B1 | 8/2001 | Wein | |
| 6,292,931 B1 | 9/2001 | Dupenloup | |
| 6,298,468 B1 | 10/2001 | Zhen | |
| 6,311,309 B1 | 10/2001 | Southgate | |
| 6,324,678 B1 | 11/2001 | Dangelo et al. | |
| 6,327,693 B1 | 12/2001 | Cheng et al. | |
| 6,353,806 B1 | 3/2002 | Gehlot | |
| 6,353,915 B1 | 3/2002 | Deal et al. | |
| 6,360,356 B1 | 3/2002 | Eng | |
| 6,366,874 B1 | 4/2002 | Lee et al. | |
| 6,378,115 B1 | 4/2002 | Sakurai | |
| 6,381,563 B1 | 4/2002 | O'Riordan et al. | |
| 6,381,565 B1 | 4/2002 | Nakamura | |
| 6,401,230 B1 | 6/2002 | Ahanessians et al. | |
| 6,421,816 B1 | 7/2002 | Ishikura | |
| 6,438,729 B1 | 8/2002 | Ho | |
| 6,438,731 B1 | 8/2002 | Segal | |
| 6,440,780 B1 | 8/2002 | Kimura et al. | |
| 6,449,762 B1 | 9/2002 | McElvain | |
| 6,457,164 B1 | 9/2002 | Hwang et al. | |
| 6,473,885 B1 | 10/2002 | Wallace | |
| 6,477,683 B1 | 11/2002 | Killian et al. | |
| 6,477,688 B1 | 11/2002 | Wallace | |
| 6,477,689 B1 | 11/2002 | Mandell et al. | |
| 6,480,985 B1 | 11/2002 | Reynolds et al. | |
| 6,487,698 B1 | 11/2002 | Andreev et al. | |
| 6,490,545 B1 | 12/2002 | Peng | |
| 6,505,328 B1 | 1/2003 | Van Ginneken et al. | |
| 6,505,341 B1 | 1/2003 | Harris et al. | |
| 6,516,456 B1 | 2/2003 | Garnett et al. | |
| 6,519,742 B1 | 2/2003 | Falk | |
| 6,519,755 B1 | 2/2003 | Anderson | |
| 6,523,156 B1 | 2/2003 | Cirit | |
| 6,539,536 B1 | 3/2003 | Singh et al. | |
| RE38,059 E | 4/2003 | Yano et al. | |
| 6,546,528 B1 | 4/2003 | Sasaki et al. | |
| 6,574,787 B1 | 6/2003 | Anderson | |
| 6,591,407 B1 | 7/2003 | Kaufman et al. | |
| 6,684,379 B1 | 1/2004 | Skoll et al. | |
| 6,700,899 B1 * | 3/2004 | Cao | 370/450 |
| 6,704,873 B1 | 3/2004 | Underwood | |
| 6,766,359 B1 * | 7/2004 | Oliveira et al. | 709/213 |
| 6,785,873 B1 | 8/2004 | Tseng | |
| 6,810,031 B1 * | 10/2004 | Hegde et al. | 370/351 |
| 6,813,266 B1 * | 11/2004 | Chiang et al. | 370/389 |
| 2001/0018758 A1 | 8/2001 | Tanaka et al. | |
| 2002/0023256 A1 | 2/2002 | Seawright | |
| 2002/0038447 A1 | 3/2002 | Kim et al. | |
| 2002/0042904 A1 | 4/2002 | Ito et al. | |
| 2002/0046386 A1 | 4/2002 | Skoll et al. | |
| 2002/0049957 A1 | 4/2002 | Hosono et al. | |
| 2002/0059054 A1 | 5/2002 | Bade et al. | |
| 2002/0112221 A1 | 8/2002 | Ferreri et al. | |
| 2002/0138244 A1 | 9/2002 | Meyer | |
| 2002/0166100 A1 | 11/2002 | Meding | |
| 2003/0004699 A1 | 1/2003 | Choi et al. | |
| 2003/0005396 A1 | 1/2003 | Chen et al. | |
| 2003/0016206 A1 | 1/2003 | Taitel | |
| 2003/0016246 A1 | 1/2003 | Singh | |
| 2003/0036871 A1 | 2/2003 | Fuller et al. | |
| 2003/0177455 A1 | 9/2003 | Kaufman et al. | |
| 2003/0198231 A1 * | 10/2003 | Kalkunte et al. | 370/395.31 |
| 2004/0100954 A1 * | 5/2004 | Dai et al. | 370/389 |
| 2004/0143801 A1 | 7/2004 | Waters et al. | |
| 2005/0089049 A1 * | 4/2005 | Chang et al. | 370/396 |

FOREIGN PATENT DOCUMENTS

| | | |
|---|---|---|
| EP | 0 433 066 | 6/1991 |
| EP | 0 720 233 | 7/1996 |
| EP | 0 901 088 | 3/1999 |
| EP | 1 065 611 | 1/2001 |
| JP | 58-060559 | 4/1983 |
| JP | 03-225523 | 10/1991 |
| JP | 07-049890 | 2/1995 |
| JP | 08-314892 | 11/1996 |
| JP | 2001-068994 | 3/2001 |
| WO | WO98/37475 | 8/1998 |
| WO | WO98/55879 | 12/1998 |
| WO | WO99/39268 | 8/1999 |
| WO | WO00/65492 | 11/2000 |

OTHER PUBLICATIONS

Gassenfeit, E. H., "Control System Design Realization via VHDL-A: Requirements", Proceedings of the 1996 IEEE International Symposium on Computer-Aided Control System Design, Sep. 15, 1996, pp. 282-285.

Kutzschebauch, "Efficient logic optimization using regularity extraction", Proceedings of 2000 International Conference on Computer Design, Sep. 17, 2000, pp. 487-493.

Lahti, et al., "SADE: a Graphical Toll for VHDL-Based System Analysis", 1991 IEEE International Conference on Computer-Aided Design, Nov. 11, 1991, pp. 262-265.

Lin, et al., "A Goal Tree Based High-Level Test Planning System for DSP Real Number Models", 1998 Proceedings of International Test Conference, Oct. 18, 1998, pp. 1000-1009.

Maxfield, C., "Digital Logic Simulation: Event-Driven, Cycle-Based, and Home-Brewed", Electrical Design News, 41(14):129-136 (1996).

Mentor Graphics Corporation, Renoir HDL Design Datasheet, pp. 1-2, 1999, Oregon.

Mentor Graphics Corporation, Renoir™ With HDL2Graphics™, pp. 1-6, 1998, Oregon.

NB84035598, "Binary Relational Schema to Model Structured LSI Design", IBM Technical Disclosure Bulletin, vol. 26, No. 10B, Mar. 1984, pp. 5598-5601.

NN7807629, "Functional Oriented Symbolic Macromodeling Algorithm", IBM Technical Disclosure Bulletin, vol. 21, No. 2, Jul. 1978, pp. 629-631.

NN8006341, "Macro Physical-To-Logical Checking LSI Chip Design", IBM Technical Disclosure Bulletin, vol. 23, No. 1, Jun. 1980, pp. 341-345.

NN9407481, "Functional Modeling using object Collaboration Diagram", IBM Technical Disclosure Bulletin, vol. 37, No. 7, Jul. 1994, pp. 481-486.

Parlakbilek, et al., "A Multiple-Strength Multiple-Delay Compiled-Code Logic Simulator", IEEE Transactions on Computer-Aided Design of Integrated Circuits and Systems, 12(12):1937-1946 (1993).

Pedram et al., "Floorplanning with Pin assignment", 1990 IEEE International Conference on Computer-Aided Design, Nov. 11, 1990, pp. 98-101.

Su, Stephen, "An Interactive Design Automation System", Proceedings of the 10th Design Automation Workshop on Design Automation, pp. 253-261, Jun. 1973.

Yli-Pietila, et al., "The Design and Simulation of Complex Multitechnology Systems", IEEE International Conference on Systems Engineering, Aug. 9, 1990, pp. 474-477.

* cited by examiner

NETWORK DEVICE SWITCH

TECHNICAL FIELD

This invention relates to a switch for transmitting data from a network processor to one or more network devices.

BACKGROUND

Current network processors have a fixed capacity to send and receive data. For example, a network processor may be limited to sending data to one network device at a time. Such limitations can prove constraining, particularly in view of the numbers of devices that can reside on a network.

DESCRIPTION

Figure 1:
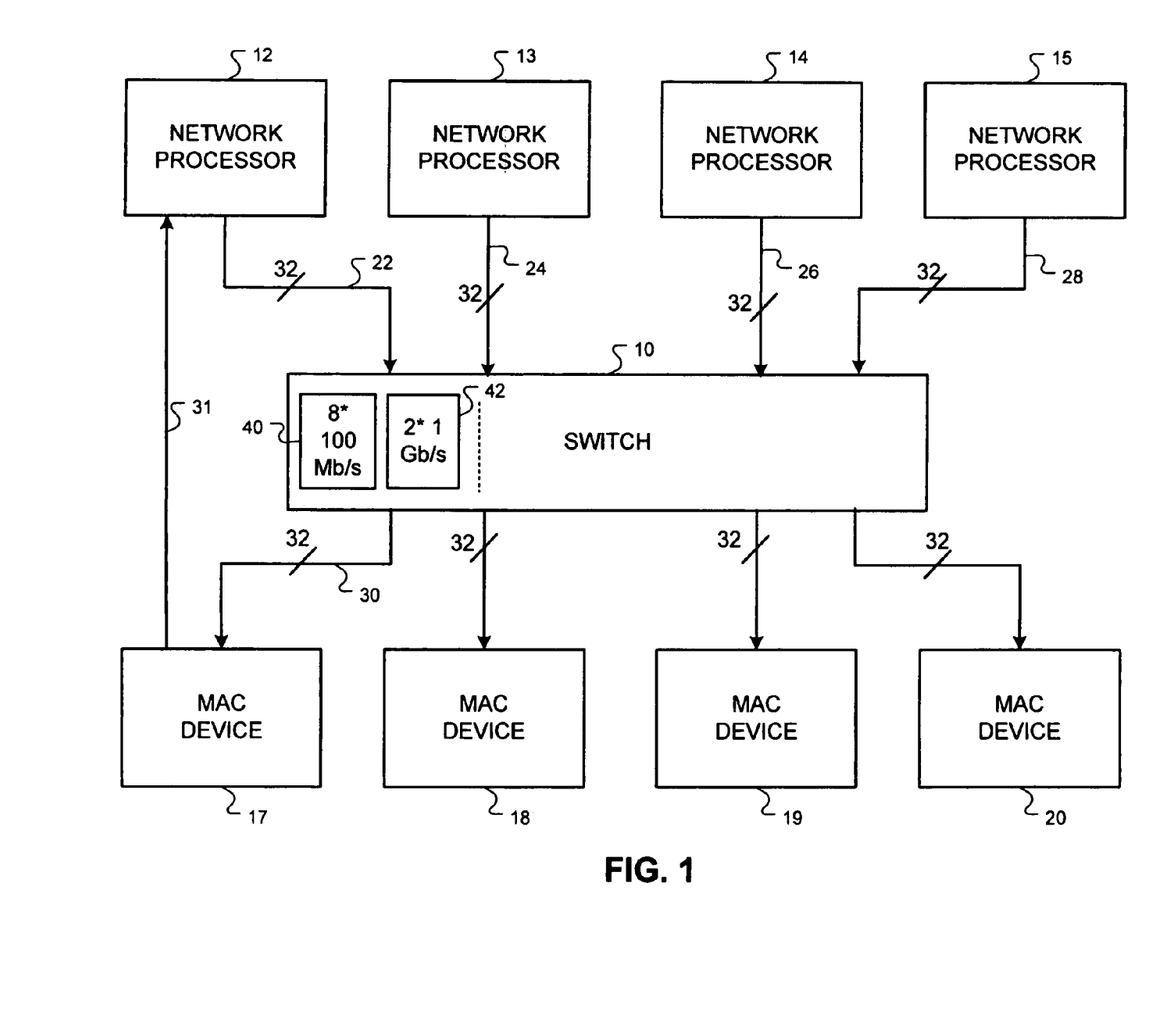
FIG. 1 is a block diagram of a system containing a switch connecting network processors to network devices.

Referring to FIG. 1, a crossbar switch 10 for use with one or more network processors is shown. Switch 10 may be used alone, as shown in FIG. 1, to transmit data from one or more network processors 12 to 15 to various network devices, such as media access control (MAC) devices 17 to 20 or other network processors (not shown in FIG. 1). Switch 10 may be used in combination with other, identical switches, to transmit data from the one or more network processors 12 to 15 to the MAC devices or other network processors.

Switch 10 allows a network processor to communicate with multiple network devices in a single clock cycle. As a result, the communications capacity of the network processor is increased, along with the efficiency of the network.

Switch 10 receives data from a network processor 12 via a 32-bit bus 22 that connects switch 10 to network processor 12. A separate 32-bit bus 24, 26, 28 may be provided for each network processor to transmit data to each switch. Switch 10 outputs data to the MAC, or other, devices over one or more 32-bit output buses, such as bus 30. Data is output to each bus via 100 Mb/s (megabit per second) ports 40, 1 Gb/s (gigabit per second) ports 42, or some combination thereof, as described below. Data transfers 31 from the MAC, or other, devices to the network processor generally take place over one or more buses that are external to switch 10.

Figure 2:
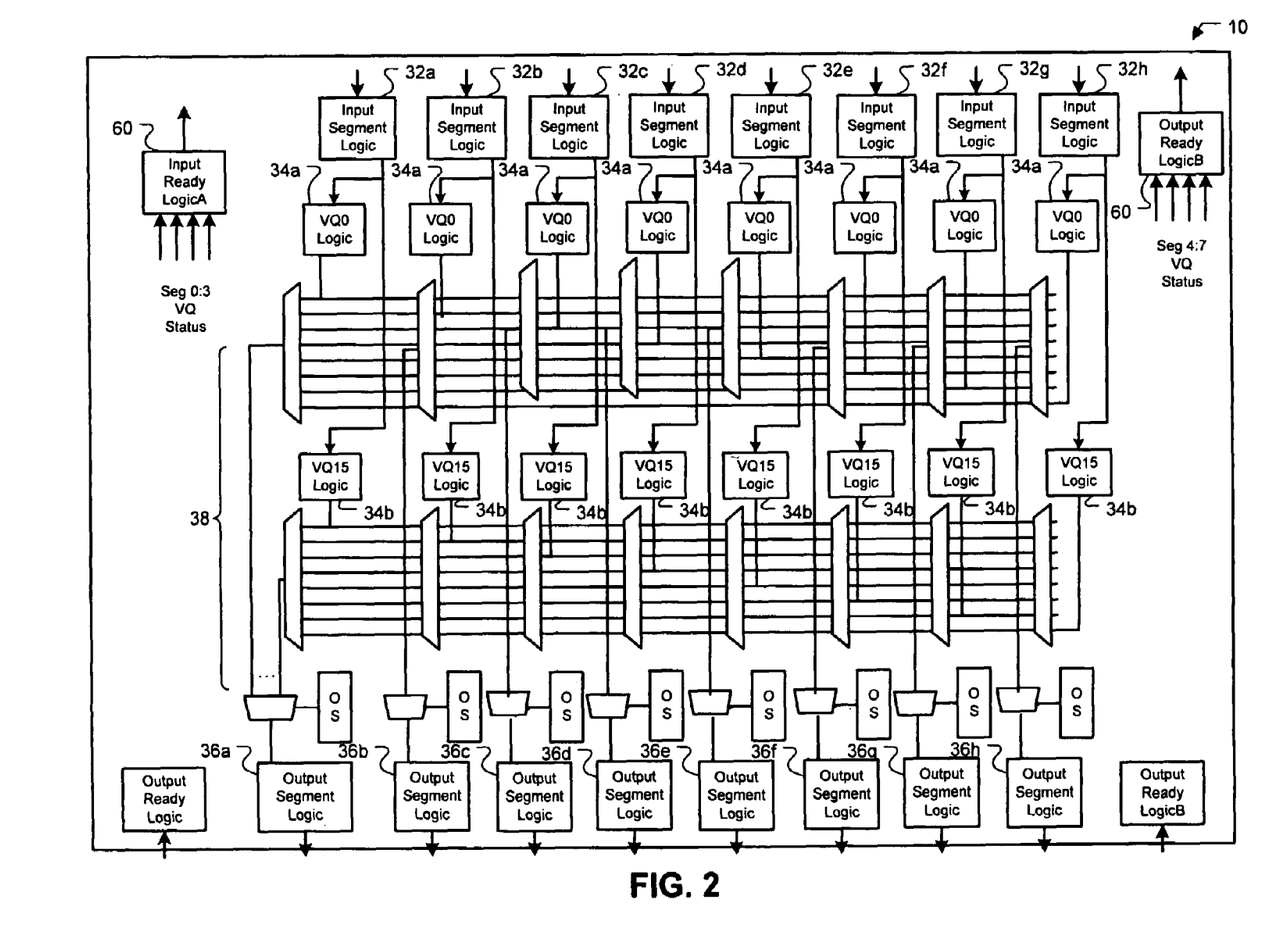
FIG. 2 is a circuit diagram of the switch fabric.

Referring to FIG. 2, in this embodiment, the fabric of switch 10 includes eight input segments 32a to 32h, 16 virtual queues 34a to 34h (which may be considered as part of the input segments), eight output segments 36a to 36h, and multiplexers 38 connecting the virtual queues to the output segments. Generally speaking, data from the network processor(s) is received at the input segments. Logic at each input segment stores the received data in corresponding virtual queues, as shown in FIG. 2. The appropriate multiplexers are operated (e.g., by a controller on switch 10 (not shown) and/or logic in the output segments) to move, i.e., "pull", the data out of the virtual queues and into buffers in the appropriate output segments (buffers not shown in FIG. 2). From there, the data is passed to its intended destination port(s) on the output segments.

Switch 10 thus routes data from one or more network processors to an appropriate port. Each port connects to a particular MAC, or other, device. Thus, for example, as shown in FIG. 1, switch 10 may be used to route data from network processor 12 to an octal MAC device via eight 100 Mb/s ports 40 or to a dual GMAC (Giga-MAC) device via two Gb/s ports 42.

Figure 3:
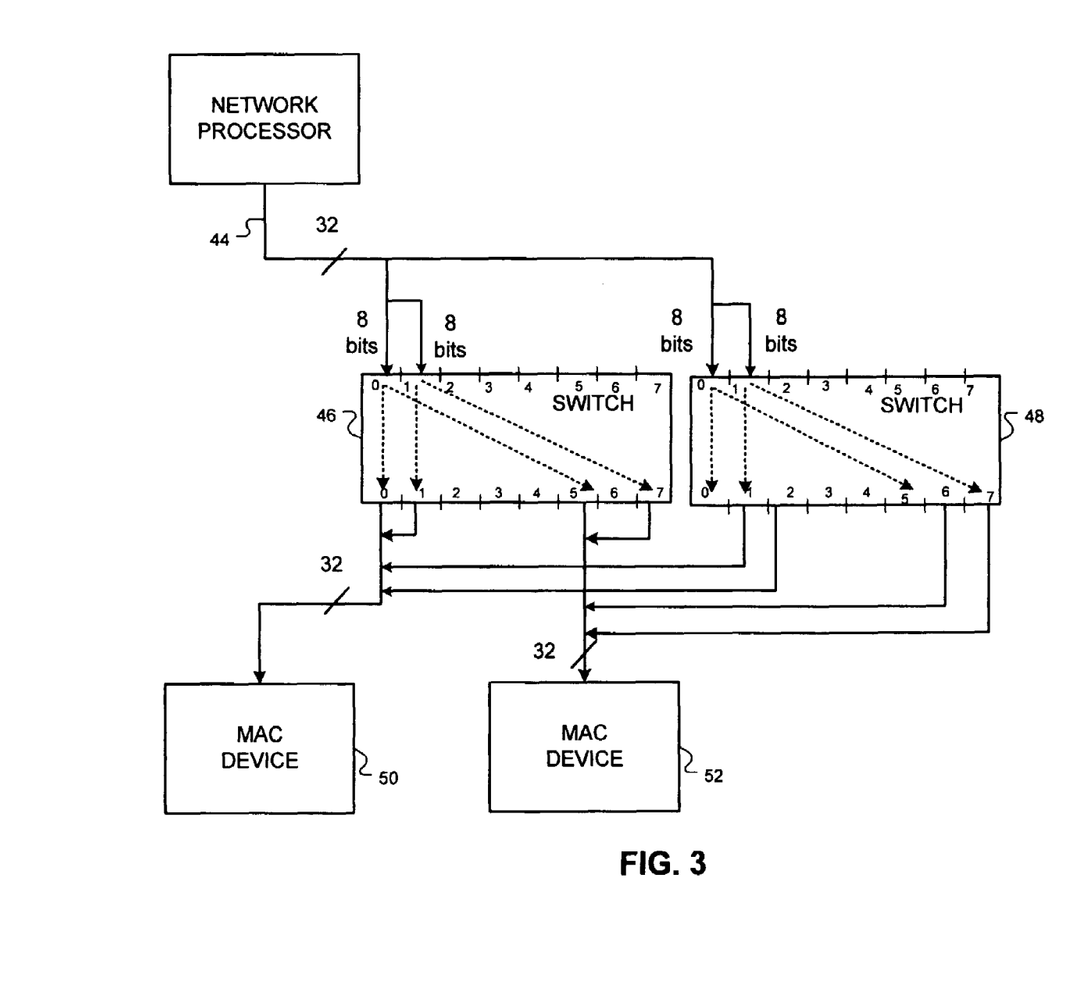
FIG. 3 is a block diagram that illustrates byte-slicing among network processors and switches.

Data from a single 32-bit bus, i.e., from a single network processor, may be "byte-sliced" and then transmitted through switch 10 or through multiple such switches. Byte-slicing refers to separating byte-sized (or other sized) "slices" of data from the 32-bit processor bus that provides data to switch 10. For example, as shown in FIG. 3, data from one (or more) 32-bit bus 44 is byte-sliced by transmitting one byte each to ports 0 and 1 of switch 46 and one byte each to ports 0 and 1 of switch 48 (both of which are identical to switch 10). Switches 46 and 48 may then route the data to the appropriate devices 50 and 52 via selected switch output ports. For example, for switch 46, data may be routed via output ports 0,1 to MAC device 50 or via output ports 6,7 to MAC device 52. Such routing may be performed for device 52.

The details of operation of switch 10 are described below. It is noted, however, that the invention is not limited to the structures and functions set forth below, or to the environment in which the switch is used.

Transmitting Byte-Sliced Data

Switch 10 sends packet data from up to eight network processors (only four network processors are shown in FIG. 1) to MAC, or other, devices on up to eight separate 32-bit output first-in, first-out (FIFO) buses. The data for each switch is byte-sliced into eight one-byte wide input segments and eight one-byte wide output segments.

Referring to FIG. 2, each output segment 36a to 36h connects to a corresponding input virtual queue for up to 16 clock cycles. Any four output segments are operated in synchronism to drive four bytes of a 32-bit FIFO output bus connected to switch 10 (e.g., bus 30 of FIG. 1). Each output segment 36a to 36e supports up to 32 output port addresses, 16 of which can be used at the same time.

The four output segments that are operated in synchronism can deliver bytes from the same 32-bit word to a transmit FIFO bus 30 during the same clock cycle. This is accomplished using ready flags associated with the output ports on switch 10 and maintained by the output segments. Assertion of a ready flag indicates that a port is ready to receive data. The four output segments update the state of their port ready flags synchronously, so that the four output segments associated with transmit FIFO bus 30 can be used to determine the availability of ports to that bus.

Switch 10 uses a "pull" model for moving packet data from the virtual queues 34a to 34h to transmit FIFO bus 30 (or to whatever bus the data is destined). More specifically, the output segments maintain a list of currently in-progress (active) data transmit operations. An input segment broadcasts the arrival of new data (e.g., a data packet) over a time division multiplex (TDM) bus on switch 10 (not shown). The arrival is broadcast to an output segment that is specified in an in-band destination address field of the new data. In response, the appropriate output segments buffer any new virtual queue mapping until completion of TDM broadcasts by all input segments. This ensures that all output segments are updated synchronously and keeps output segments for different bytes of a transmit bus in synchronism.

At switch reset, all output segments are initialized to read the first element of an active transmit list. The elements in the list specify which data is to be transmitted (based on the input segment broadcast) and, thus, which virtual queues are to be read. Ready flag information is collected for 64 to 256 output ports of switch 10, with individual output segments updating their ready flags synchronously at the conclusion of the ready collection cycle.

The four output segments in operation form a virtual bus, referred to herein as the "Ixbus". These four output segments receive new requests and get ready flag status information at the same clock cycle. Each of the four output segments makes a determination as to which of the active transmit ports are ready for service based on the status of their ready flags, and maintains a pointer into the active transmit list. When the output segments determine that a transmit port is ready, a request is sent to the virtual queue specified in the control field for that port. The four output segments connect to virtual queues in four different input segments. Each output segment "pulls" data from any one of the 128 virtual queues in switch 10, without blocking any of the other output segments from receiving data from any of the remaining input virtual queues. The output segments "pull" the data by controlling the appropriate multiplexers 38 to output the data from the virtual queues. The data is then passed through the appropriate port to the transmit FIFO bus 30.

Outputting Data From Different Types of Ports

As noted, each output segment "connects" to an input virtual queue for up to 16 cycles, four output segments are operated in synchronism to drive four bytes of the 32-bit FIFO output bus, and each output segment supports 32 output port addresses, 16 of which can be in use at a time. An output segment supports one of three modes: (i) up to 16 100 Mb/s destination ports, (ii) 1 Gb/s rate port and up to 8 100 Mb/s destination ports, or (iii) 2 Gb/s rate ports.

Figure 4:
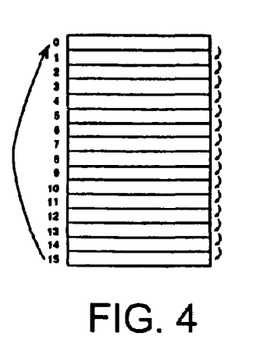
FIGS. 4, 6 and 7 show output buffer allocation for different types of network devices.

For the first mode in which all destination ports are 100 Mb/s, equal output FIFO bus bandwidth is allotted to each port (FIG. 4). An output controller (e.g., output segment logic 36*a* to 36*e*) selects from a list (FIG. 5) of 16 active output destinations maintained by the output segment logic. The first list entry is associated with that segment's output ports having port_address[3:0]=4b'0000, the second entry is for port_address[3:0]=4b'0001, etc., with the last entry for port_address[3:0]=4b'1111. Each entry contains the virtual queue address of data for an associated port address.

Figure 5:
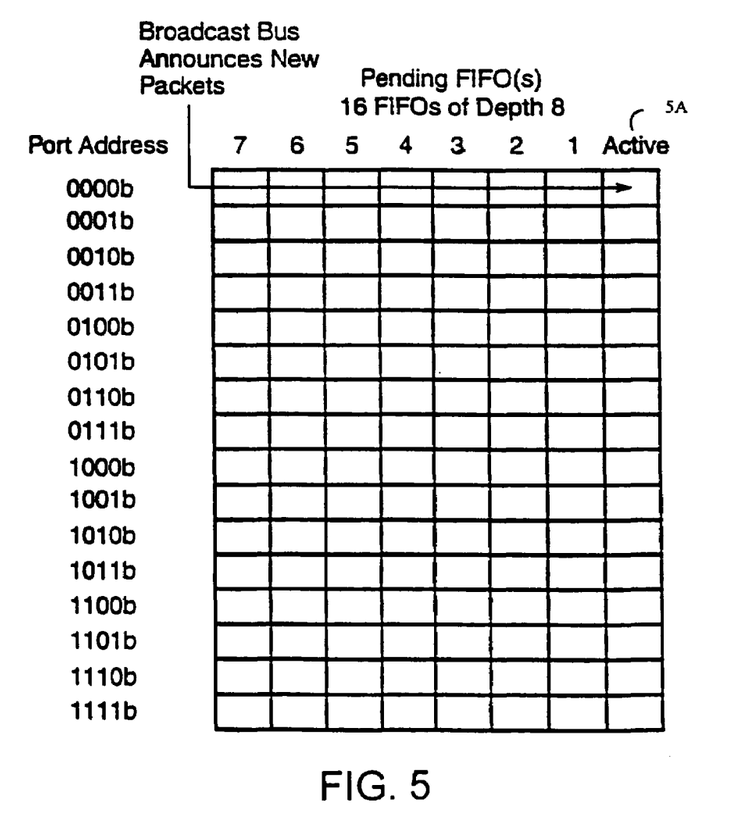
FIG. 5 is a table showing the contents of an output buffer for ports on a network device.

The output segment controller sequences through the active list and "pulls" data from the virtual queue specified by a list entry. Each output segment can connect to any of 128 virtual queues any time without interfering with any other output segment drawing data from any other virtual queue at the same time. Since the interconnect data paths are non-conflicting, once the output segment "connects" to a virtual queue, an M-packet can be driven to the Ixbus continuously, with a new byte being supplied to an output segment by the virtual queue each switch clock cycle.

There is a four-cycle "connect" latency between a virtual queue and an output segment. The output segment control logic overlaps the connection to the next virtual queue in the output list by requesting the connection when a current packet is three bytes from completion. Entries in the output list that are not active, and entries whose output transmit FIFOs are not ready, are skipped in the cycle.

Each switch polls the state of the FIFO ready flags in the output segments. The switch then broadcasts the state of the entire system's ready flags on a common bus, so that each output segment for every switch can update the ready state of the port associated with the output segment every 32 cycles. The output segment controls when to transmit data, is responsible for avoiding over-run by checking the output ready flags, and avoiding under-run by ensuring that each port on the active lists receives sufficient output bus bandwidth.

After an M-packet is transmitted from an output segment, a list entry remains active unless an EOP (end of packet) signal was sent. Upon completion of a packet, the entry is invalidated and a new packet is activated if an entry in the "pending FIFO" is present for that destination port address.

Figure 6:
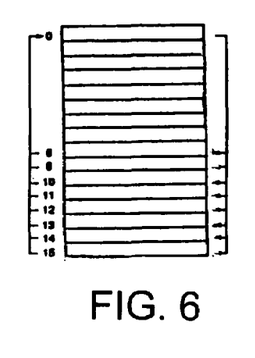

In a second mode, a one gigabit port and eight 100 Mb/s ports are connected to switch 10. An output segment provides one M-packet bus time slice for the gigabit port for every M-packet time slice given to a 100 Mb/s port. The 100 Mb/s port uses entries 0–7, while the gigabit port uses entry 8. The output sequence is 0–8, 1–8, etc. (see FIG. 6).

Figure 7:
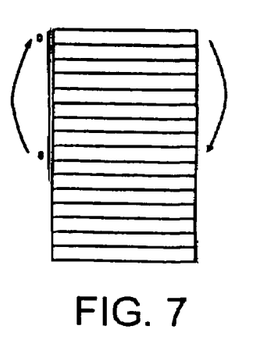

For two one gigabit ports, the output segment simply alternates between each gigabit port (0–8, 0–8, etc.). That is, data is stored in, and output from, the output FIFO according to the manner shown in FIG. 7.

Data Transmission From Output FIFO

As noted above, the eight input segments 32*a* to 32*h* share a TDM bus that is used to broadcast the destination address and the virtual queue assigned to store data for, e.g., a newly-received Ethernet packet. Timeslots for broadcast on the TDM bus are determined from a counter (not shown) on switch 10 that starts with de-assertion of a reset and that is synchronous with respect to all switches in a system (if there is more than one switch in the system). Thus, the corresponding input segments for every switch gain access to the TDM bus on the same cycle.

Upon receipt of a data packet, an input segment receiving the data packet extracts the virtual queue and destination port address from two "prepend" bytes in the data packet's header. The input segment broadcasts the destination port address and the virtual queue address over the TDM bus.

The destination port address is eight bits in this embodiment. The destination port address is used to select the output segment to which the data is to be transferred. Each output segment contains a pending FIFO comprised of 16 FIFO buffers, each of which is eight entries deep. FIG. 5 shows pending FIFOs for 16 ports.

An output segment loads the pending FIFO row selected by the destination port address. The virtual queue and destination port address specified by the data are loaded for each pending FIFO entry. Each transmitting processor sends only one packet at a time to any output port destination address. Thus, eight entries per pending FIFO row is sufficient to queue data packets being transmitted from every network processor connected to the switch. The entry at the "head" 54 of a row in the pending FIFO is the active entry for that row's destination port address. This entry is output from the switch first for that port. A pending FIFO row is advanced when the last M-packet for the data packet is transmitted on the output FIFO bus. In this context, an M-packet is a 64-byte portion of an Ethernet data packet.

Outputting Data to a Network Processor

Each 32-bit output FIFO of switch 10 can be configured to operate in so-called "S" mode. The "S" mode operation of an output FIFO bus allows a network processor connected to an input FIFO bus (bus 58 in FIG. 8) to move data to one or more network processors connected to the output FIFO bus.

Figure 8:
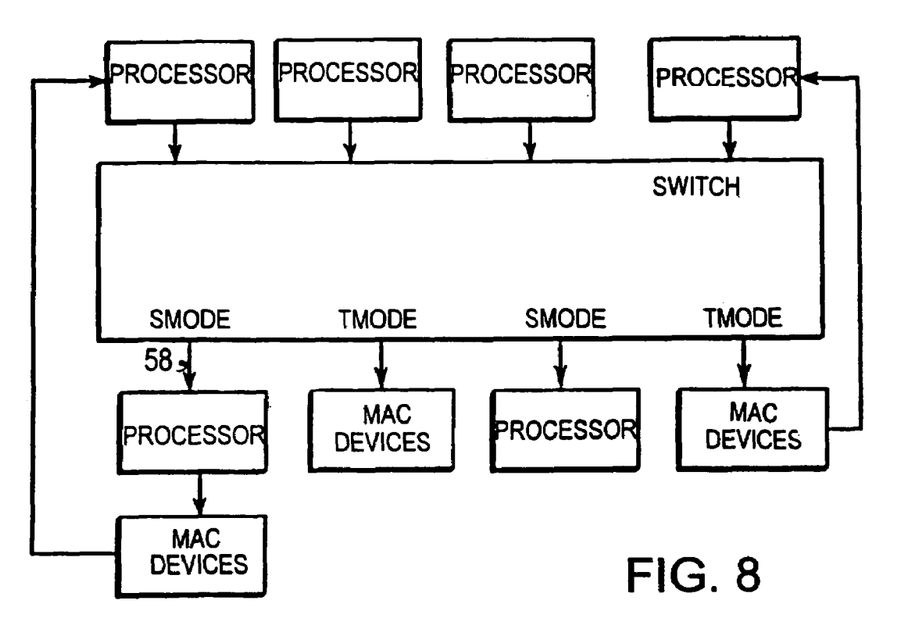
FIG. 8 is a block diagram of network processors connected to the input and output of a switch.

In "normal", or "T" mode, an output segment of switch 10 cycles through an active list of destination ports and sources data to either (i) 16 100 Mb/s ports, 8 100 MB/s ports, and 1 GB/s port, or (ii) 2 GB/s ports. The output segment connects to the virtual queue of an active port long enough to deliver one M-packet (64 bytes) of an Ethernet packet to that port and then attempts to connect to another ready port on the active list. In this mode, the output segment drives the transmit select and FPS (FIFO Port Select address), and pushes packet data into a transmit FIFO that is known to have space for an M-packet based on the polling status of the ready signal.

In "S" mode, the output segment connects to the virtual queue of a destination port on the active list for the entire Ethernet packet before moving to the next entry in the active list. The output moves an M-packet of data to a 16 byte buffer (four output segments work in concert) and asserts a "ready flag" once the first byte has arrived. For a network processor system, the ready signal is driven to a fast ready input. The network processor connected to the output bus performs a "bus receive" operation by asserting a select signal to the four switch output segments that make up the "S" mode FIFO output bus. The output segment drives the first byte of data onto the FIFO bus one cycle later.

If the M-packet is the start of an Ethernet packet, start-of-packet (SOP) data is included in the first data byte. End-of-packet (EOP) and fast blind equalization (FBE) data are included on the last long-word of the M-packet packet. Once the first byte is driven to the FIFO bus, and removed from the 16-byte single M-packet FIFO, output segment control logic retrieves the next M-packet from the same virtual queue that provided the first M-packet. The output FIFO is loaded with the next M-packet (if an M-packet is present at the virtual queue) as the current M-packet is unloaded. The ready flag for the "S" mode output segment is asserted when the first byte of an M-packet is loaded from the virtual queue, and is reset when the first byte of the M-packet is unloaded and driven onto the FIFO bus 30.

Control (Prepend) Data

Each network processor transmitting through switch 10 over a FIFO bus can interleave data from multiple (e.g., up to 16) Ethernet packets. The network processor sends an M-packet (64 bytes) for each transmit select signal that it outputs. The control information used to steer the M-packet packet data to its appropriate destination port is included in the M-packet itself. The control information includes, but is not limited to, the following:

(1) Port Address: eight bits defining 256 destination port addresses.
(2) Virtual Queue Number: four bits used to select the virtual queue to buffer the M-packet.
(3) SOP: one bit to enable the SOP signal when forwarding the M-packet.
(4) FBE: one bit per byte, four bits in total to determine byte enables at the end of a packet.
(5) TXASIS/TERR: one bit to distinguish packet data from switch configuration data.

Since the switch contains eight byte-sliced input and output segments, each input segment uses 15 bits of address/control information per M-packet. The control information is placed in-band for each M-packet. More particularly, two bytes of control information are prepended to each 16 bytes of payload data delivered to switch 10. The input segments examine this prepend data in order to determine where the byte-slices are to be stored.

The 16th bit of the prepended bytes (TXASIS/TERR) is used as a mode bit, to distinguish packet data from switch configuration register write data. Network processor 12 "transmit" micro-code loads eight bytes of prepend data for every M-packet sent to switch 10. Prepend bytes 0 and 4 are the 16 bits of control data for switch byte slice 0, prepend bytes 1 and 5 for byte slice 1, prepend bytes 2 and 6 for byte slice 2, and prepend bytes 3 and 7 for byte slice 3. The port addresses, SOP, TXASAIS, and virtual queues specified for the four-byte slice noted above are the same as the data noted above. The FBE bit for each byte slice is developed from the byte packet byte count.

Over-Subscribing Ports

As noted above, each 32-bit output FIFO bus can support 16 10/100 Mb/s rate ports, 1 Gb/s port and 8 10/100 Mb/s ports, or 2 Gb/s ports at full line rate. In some system configurations, it is desirable to configure more ports on an output FIFO bus than can be serviced at the given line rate. This is referred to as oversubscribing the bus.

A total of 128 destination addresses are used in the prepend data to support 16 100 Mb/s ports on 8 output FIFO buses. In this embodiment, 3 address bits are used to select the output segment/FIFO bus, and 4 address bits are used to select the one of the 16 10/100 Mb/s ports that can be supported on an output FIFO bus. If a gigabit port is configured on an output FIFO bus, eight equivalent 10/100 Mb/s port addresses are used.

Over-subscription is accomplished by the logic in each output segment sequencing based on the 7 LSBs (least significant bits) of the destination address, while supporting additional more significant destination address bits to form an additional port select code signal per output bus. The switch stores one additional address bit in the pending/active queue for each port address, enabling a maximum of two-times (2×) over-subscription. This allows output segments to transmit to 32 100 Mb/s ports, 4 Gb/s ports, or 16 10/100 Mb/s ports and 2 Gb/s ports, effectively doubling connectivity. A network processor queue select code is responsible for transmitting to only one of the two ports with the same destination address at a time.

Resolving Port Conflicts Among Network Processors

A priority-based arbitration scheme may be used to resolve destination port conflicts within switch 10. This scheme, however, may not address blocking or quality of service (QoS) issues associated with output queues distributed on multiple processors, such as the multiple processor system shown in FIG. 1. A message protocol between the various network processors is therefore used, enabling the independent network processors to select ports for packet transmission for bandwidth efficiency and QoS.

Figure 9:
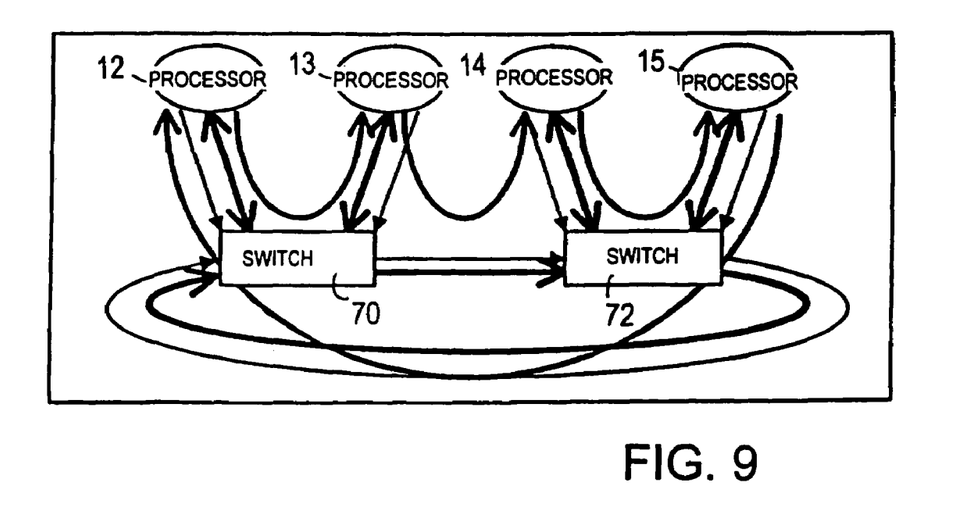
FIG. 9 is a block diagram of a communication ring created among network processors using two switches.

A network processor 12 uses the "put" and "get" capability of the "ready bus" (not shown) of switch 10 to communicate destination port status information with neighboring network processors 13 to 15. Each network processor uses a "get" command to obtain data from the ready bus and a "put" command to provide data to that bus. This establishes a "ring" (FIG. 9) connecting the network processors. Data is passed from processor to processor via this ring. FIG. 9 shows a two-switch 70, 72 ring, which uses buses on both switches to pass the data among the network processors. In this embodiment, two ready bus message FIFOs are provided to enable communication between network processors.

In a "full" system, each network processor receives packets for up to 16 output switch ports, and maintains output queues for up to 128 ports. Thus, there are output queues for all ports in the system, which are distributed in the packet memory of all network processors connected to switch 10. Switch 10 resolves destination conflicts using a first arrival policy. That is, the first data to arrive for a port, gets the port. The network processors, however, can use the ready bus to cooperatively determine which network processor has "ownership" over a particular destination port, thereby alleviating the need for resolution by switch 10.

At any time, each network processor can control 16 destination port addresses. The network processor transmits data from queues for destination ports that it currently "owns". The result is that each destination port is selected by only one network processor for the duration of a data packet. With only a single source for any destination, there are no output port conflicts to be resolved by the switch 10. Moreover, input FIFO bus bandwidth is not wasted by data packets stalled in a switch virtual queue.

The protocol for communication among network processors over the switch bus also enhances QoS. Multiple destination port queues are distributed throughout each of the network processor memories. The network processors can broadcast the status of these queues through the message ring established on the switch bus, so that other network processors know to pass ownership of a port rather than to transmit if a higher priority queue for that port exists on another network processor. Another QoS process that does not broadcast queue status allows each network processor to use, or to pass, port ownership based on the contents of the queues for that port that are resident on a network processor. If a high priority queue is ready, a packet is transmitted from that port. For lower priority queues, the port is passed initially and the priority of that queue is increased.

Switch 10 schedules packet transfer to a destination port on a first-come, first-served basis. A virtual queue that is waiting for an output segment to "pull" its data will signal "not ready" to the network processor that is transmitting through it when a predetermined transmit threshold (i.e., maximum amount of data) is reached. The virtual queue buffers and this backpressure mechanism ensures proper functionality when contention of a destination port occurs. However, usable input and output Ixbus bandwidth may be wasted with destination port conflicts. A method is therefore provided for coordinating transmit packet selection between different network processors to better utilize switch bandwidth and to address priority QoS issues for packets destined for the same port but residing in different network processor memories.

At any instant, each network processor that is transmitting through switch 10 owns 1/N of the ports on switch 10, where N is the total number of ports on switch 10. For instance, in an eight-processor system with 128 10/100 Mb/s ports, each network processor "owns" 16 destination ports at a time. The network processors exchange messages with neighboring network processors using the bus message protocol noted above. A complete ring network, in which a last processor passes messages back to a first processor, is formed for passing messages.

A transmit poller thread in each network processor determines if a packet for a destination port presently owned by that network processor is available on any output queue of the network processor associated with that destination port. If a high priority queue for an owned destination port is not empty, the network processor initiates a transmit to that port. If only lower priority queues for a port are ready, the network processor makes a determination as to whether to use the port to transmit or to pass ownership and raise the priority of queues associated with the network processor.

Scheduling Data Transfers for Different Types of Ports

Each network processor supports output queues for all destination ports connected to the switch fabric. Transmission of data from a network processor to a destination port is accomplished under processor micro-code control using several micro-engine code threads. A code thread, designated the "poller/arbiter", determines which destination ports are "owned" by the processor. The output queues of "owned" destination ports are scanned for new packets to be sent through the switch. A software queue structure containing entries that specify an output queue to service serves as the interface between the poller/arbiter thread and a transmit/scheduler code thread (described below).

The transmit/scheduler thread sends packet data to the 16 virtual queues 34a to 34h at the input of switch 10. Two of the virtual queues in each input segment are sized at 8 M-packets in depth (512 bytes) to facilitate Gb/s rate transmits, while the remaining 14 queues are 4 M-packets in depth. The transmit/scheduler thread:

(1) determines when enough input Ixbus bandwidth is available to start a new packet,
(2) selects the virtual queue to be used in forwarding the packet through the switch,
(3) determines the ready status of the virtual queues for in-progress transmission of packets, and
(4) assigns transmit "fill" and FIFO elements which determine the order packets are to be forwarded across the Ixbus.

The transmit/scheduler thread can start a new 100 Mb/s packet whenever a virtual queue is available. For systems with both 100 Mb/s and Gb/s ports, the transmit/scheduler thread assigns the first 14 100 Mb/s packets to a 4 M-packet depth virtual queue. The 8 M-packet virtual queues are assigned to 100 Mb/s port transmits only if all 14 "shallow" queues are in use and there are no Gb/s transmits pending.

The start condition for transmitting data to a Gb/s port is dependent on the start threshold for transmitting to Gb/s Ethernet wire in a gigabit MAC device. If the gigabit port threshold is set to 1518 bytes (i.e., a full Ethernet packet), the transmit/scheduler thread starts to transmit to the Gb/s port if a virtual queue is available. One of the two 8 M-packet virtual queues is selected if it is available. At the same time, all in-progress transmits to 100 Mb/s continue to be serviced with $\frac{1}{16}$ of the Ixbus bandwidth. If there are more than 8 in-progress 100 Mb/s transmits, when a 100 Mb/s port completes a packet, bandwidth is added to the Gb/s port transmission. The Gb/s transmit builds up to ½ the Ixbus bandwidth, which exceeds the Gb/s bandwidth of the destination port. A new transmit can start while one Gb/s port is in progress if less than 7 100 Mb/s ports are supported. If a second Gb/s port starts, the second port acquires bandwidth at the completion of the remaining 100 Mb/s ports. Once 2 Gb/s ports are in progress, no new packet transmits are started until one of the Gb/s ports transmits.

If the gigabit port start threshold is small (e.g., 16 bytes), a 1 Gb/s bandwidth, from the network processor, through the switch, to the gigabit MAC device is supported from the beginning of the data packet. The transmit/scheduler thread waits until there are 8 or less 100 Mb/s transmissions in progress, or only 1 Gb/s port in progress, before starting transmission of an Ethernet packet to a gigabit port destination.

Sizing the Virtual Queues

In this embodiment, there are 8 output segments, all of which can move byte-wide data from any of 128 virtual queues on multiple switches without restricting the access of any input segment to any of the 128 input segment virtual queues. The output segment "connects" to an input virtual queue for up to 16 cycles. As noted, four output segments are operated in synchronism to drive the 4 bytes of a 32-bit FIFO output bus.

The transmit FIFO bus of each network processor drives one input segment of switch 10 with packets to be forwarded to any of the output FIFO bus 30/output port connected to switch 10. For a four-switch configuration, there are 256 output port destinations. The number of 100 Mb/s ports that a network processor can support at a given time is limited by the transmit FIFO bus (e.g., bus 30 of FIG. 1) bandwidth. At 66 Mhz or for a 15 ns cycle, 285 ns comprised of 19 bus cycles (16 data+2 control data+1 gap) are required for each 64 bytes of data to the switch. For large packets, a maximum of 18 packets (5120 ns/285 ns) running at 100 Mb/s can be supported on the FIFO bus 30. Since the number of packets being transmitted by a network processor at any instance is limited by the transmit FIFO bus bandwidth, the number of virtual queues used on switch 10 can be limited to the maximum number of packets being transmitted on that FIFO bus. For implementation reasons, the number of virtual queues placed in each input segment of switch 10 is 16. At 66 Mhz, this enables a network processor to support 16 fast Ethernet packets with margin (5120−16*285=560 ns) on the transmit FIFO bus 30.

For 10/100 Mb/s ports, buffering at the destination MAC devices is for less than a full packet. Thus, for 10/100 Mb/s ports, once the initial bytes of an Ethernet packet are transferred to the MAC device, the packet data is delivered at the 10/100 line rate for the entire packet length. The network processor also transmits packet data to the switch at the 10/100 line rate; otherwise substantial packet buffering at the input of the switch is necessary.

As noted above, 14 of the 16 virtual queues in each input segment are four M-packets in depth, and the remaining two virtual queues have a depth of eight M-packets. Four M-packets is sufficient for 10/100 Mb/s ports where an M-packet is received and transmitted once every 5120 ns to maintain the 100 Mb/s line rate. Two of the virtual queues are sized at eight M-packets in depth to support a gigabit line rate that requires using 50% of the input FIFO bus bandwidth.

The invention is not limited to the specific embodiments set forth herein. For example, switch 10 is not limited to use with network processors and can be used with any type of device that transmits data. Switch 10 is also not limited to use with the MAC devices noted above. The switch fabric is not limited to the particular configuration or circuitry shown in FIG. 1.

Other embodiments not described herein are also within the scope of the following claims.

What is claimed is:

1. A switch for transmitting data from a first device to a second device, comprising:
   output segments comprising output ports in communication with the second device, the output segments comprising buffers;
   input segments which receive slices of data from the first device;
   queues which store the slices of data;
   circuitry for selectively outputting a slice of data from a queue to an output segment for transmission to the second device; and
   a bus over which the first device communicates with a third device, the first device communicating to the third device that the first device controls an output port thereby preventing the third device from transmitting data to the second device via the output port;
   wherein the input segments broadcast receipt of new data to the output segments, and the output segments buffer information relating to the new data following broadcast in order to keep the output segments in synchronism.

2. The switch of claim 1, wherein the slices of data comprise control data, the input segments storing the slices of data in the queues based on contents of the control data.

3. The switch of claim 2, wherein the control data for each slice of data specifies a queue into which the slice of data is to be stored.

4. The switch of claim 2, wherein the control data for each slice of data specifies an output port to which the slice of data is to be output.

5. The switch of claim 2,
   wherein each of the output segments comprises logic which controls the circuitry to selectively output a slice of the data from a queue.

6. The switch of claim 5, wherein the output segments control the circuitry following broadcast.

7. The switch of claim 1, wherein the output ports comprises one of a 100 Mb/s destination port and a 1 Gb/s rate port.

8. The switch of claim 1, wherein the first device comprises a network processor and the second device comprises one of a media access control device and a network processor.

9. The switch of claim 1, wherein the slices of data comprise control data identifying ports to which the slices of data are to be output; and
   wherein the control data contains a predetermined number of bits, and the circuitry selects an output segment using more than the predetermined number of bits.

10. A switch for transmitting data from a network processor to multiple devices, comprising:
    input segments which receive slices of data from the network processor and which store the slices of data in respective queues;
    output segments comprising ports with connections to the multiple devices, the output segments comprising buffers; and
    circuitry for selectively outputting the slices of data from the queues to the output segments for transmission to the multiple devices;
    the network processor communicating to a second network processor over a bus that the network processor controls an output port thereby preventing the second network processor from transferring data to multiple devices via the output port;
    wherein the slices of data contain control data identifying ports in the output segment to which the slices of data are to be output;
    wherein the control data contains a predetermined number of bits, and the output segments define the ports using more than the predetermined number of bits; and
    wherein the input segments broadcast receipt of new data to the output segments, and the output segments buffer information relating to the new data following broadcast in order to keep the output segments in synchronism.

11. The switch of claim 10, where each output segment contains (i) up to 16 100 Mb/s destination ports, (ii) 1 Gb/s rate port and up to 8 100 Mb/s destination ports, or (iii) 2 Gb/s rate ports.

12. The switch of claim 10, further comprising a bus over which network processors connected to the switch communicate with one another.

13. A system comprising:
a first network processor;
a second network processor; and
a switch for transferring data between the first network processor or the second network processor and an output port, the switch having a bus over which the first network processor and the second network processor communicate, the first network processor communicating to the second network processor that the first network processor controls the output port thereby preventing the second network processor from transferring data to the output port, wherein the switch comprises:

input segments which receive data from the first network processor and which store the data in respective queues; and output segments comprising a port that corresponds to the second network processor, the output segments comprising buffers;

wherein the input segments broadcast receipt of new data to the output segments, and the output segments buffer information relating to the new data following broadcast in order to keep the output segments in synchronism.

14. The system of claim 13, wherein the first network processor uses a put command to transfer data to the bus and the second network processor uses a get command to retrieve data from the bus.

15. The system of claim 13, further comprising a third network processor connected to the switch, wherein data is exchanged between the first, second and third network processors via the bus on the switch.

* * * * *